(12) United States Patent
Yazaki et al.

(10) Patent No.: US 7,903,667 B2
(45) Date of Patent: *Mar. 8, 2011

(54) PACKET COMMUNICATION SYSTEM WITH QOS CONTROL FUNCTION

(75) Inventors: Takeki Yazaki, Hachioji (JP); Takeshi Aimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/324,188

(22) Filed: Nov. 26, 2008

(65) Prior Publication Data

US 2009/0080424 A1 Mar. 26, 2009

Related U.S. Application Data

(63) Continuation of application No. 11/063,850, filed on Feb. 23, 2005, now Pat. No. 7,463,635, which is a continuation of application No. 10/091,499, filed on Mar. 7, 2002, now Pat. No. 6,970,470, which is a continuation of application No. 09/386,310, filed on Aug. 31, 1999, now Pat. No. 6,434,153.

(30) Foreign Application Priority Data

Feb. 25, 1999 (JP) .................................... 11-047592

(51) Int. Cl.
*H04L 12/28* (2006.01)
(52) U.S. Cl. ..................................... 370/395.42; 370/389
(58) Field of Classification Search ........................ None
See application file for complete search history.

(56) References Cited

U.S. PATENT DOCUMENTS

| 5,130,985 | A | * | 7/1992 | Kondo et al. | 370/400 |
| 6,023,456 | A | | 2/2000 | Chapman et al. | |
| 6,167,445 | A | * | 12/2000 | Gai et al. | 709/223 |
| 6,185,221 | B1 | | 2/2001 | Aybay | |
| 6,445,679 | B1 | | 9/2002 | Taniguchi et al. | |
| 6,463,470 | B1 | | 10/2002 | Mohaban et al. | |
| 6,643,260 | B1 | | 11/2003 | Kloth et al. | |
| 6,697,352 | B1 | | 2/2004 | Ludwig | |

(Continued)

FOREIGN PATENT DOCUMENTS

JP 6-197128 7/1994

(Continued)

OTHER PUBLICATIONS

Mmais et al., "Efficient Buffer Management and Scheduling in a Combined IntServ and DiffServ Architecture: A Performance Study", IEEE.

(Continued)

*Primary Examiner* — Phirin Sam
(74) *Attorney, Agent, or Firm* — Brundidge & Stanger, P.C.

(57) ABSTRACT

A packet communication system of the present invention has first mode, second mode and third mode to apply to input packets. The first mode is a mode that decides priority of the packet by at least one of the address information and the application information, the second mode is a mode that decides priority of the packet by the DS value, the third mode is a mode that decides rewrite the DS value by at least one of the address information and the application information. A control unit of the packet communication system switches a mode to apply an input packet of the first mode, the second mode and the third mode based on the packet header information of the input packet.

11 Claims, 11 Drawing Sheets

U.S. PATENT DOCUMENTS

| | | | | |
|---|---|---|---|---|
| 6,970,470 | B2 * | 11/2005 | Yazaki et al. | 370/395.42 |
| 7,154,858 | B1 * | 12/2006 | Zhang et al. | 370/252 |
| 7,463,635 | B2 * | 12/2008 | Yazaki et al. | 370/395.21 |

FOREIGN PATENT DOCUMENTS

| | | |
|---|---|---|
| JP | 6-232904 | 8/1994 |
| JP | 7-135512 | 5/1995 |
| JP | 9-331359 | 12/1997 |
| JP | 11-032078 | 2/1999 |

OTHER PUBLICATIONS

RFC 2742, 1998.

RFC 2475, "An Architecture for Differentiated Services".

V. Kumar et al, "Beyond Best Effort: Router Architectures for the Differentiated Services of Tomorrow's Internet", IEEE Communications Magazine, May 1998, pp. 152-164.

M. Reardon, "Traffic Shapers: IP in Cruise Control", Data Communications,, Sep. 21, 1998, pp. 66-73.

"Catalyst 8500 CSR Architecture", Cisco Systems, Inc., 1998, pp. 1-19.

* cited by examiner ered herein# PACKET COMMUNICATION SYSTEM WITH QOS CONTROL FUNCTION This application is a continuation of U.S. application Ser. No. 11/063,850, filed Feb. 23, 2005, now U.S. Pat. No. 7,463,635, which is a continuation application of U.S. application Ser. No. 10/091,499, filed Mar. 7, 2002, now U.S. Pat. No. 6,970,470, which is a continuation application of U.S. application Ser. No. 09/386,310, filed Aug. 31, 1999, now U.S. Pat. No. 6,434,153, the entirety of which are incorporated herein by reference.

BACKGROUND OF THE INVENTION

1. Field of the Invention

This invention is related to a packet communication system with QoS control function, especially applicable to Diffserv.

2. Description of Related Art

Increase of Internet users, follows a sharp increase in the traffic (packets) that flows in the Internet. According to the packet communication mode used in the Internet, one line can carry packets from many users. Therefore, the packet communication mode reduces cost per a bandwidth. And strict management such as QoS (quality of service) control of every user, is not carried out in the Internet. This is also a factor of low cost of the Internet.

Telephone networks and company networks were constructed using exclusive lines respectively. But the low cost of the Internet has caused the movement of integrating telephone networks and company networks into the Internet for reduction of communication cost. For the integration, it is preferable to provide QoS guarantees such as low transmission delay, low packet discard rate, and so on, because those were realized in conventional telephone networks and company networks.

To provide the QoS guarantees, a packet is transmitted based on the priority of the packet that is decided by the agreement between a service provider (SP) and the network user, such as a company, with differentiating the applications, such as telephone traffic, or its respective users.

Japanese Unexamined Patent Publication Disclosure 6(1994)-197128 (related art (1)) shows a packet switching system that an output buffer for CBR and an output buffer for VBR are installed in every each output circuit. The output priority of a packet accumulated to the buffer for CBR is higher than that of a packet accumulated to the buffer for VBR.

Generally, an ATM (Asynchronous Transfer Mode) switching system sets a connection in advance according to an connection information table thereof. The connection information table also stores priority information.

But a router does not have a connection information table because a router, which is used in packet communication mode, does not set up a connection in advance. Therefore, to provide QoS guarantees by a router, it is required a flow detecting means that detects priority information of a packet based on information in the packet header. A router does priority transfer of a packet based on the priority information detected by the flow detecting means. In this specification, a condition for packet discrimination generated by information in the packet header, is called a flow condition. A series of traffic that meets the flow condition is called a flow. And processing that decides whether an input packet meets the flow condition, and decides necessary information for QoS control, such as priority information, is called flow detecting.

Japanese patent Laid-open print No. 6-232904 (related art 2) shows a priority control system in a router that decides relay processing priority from priority information and protocol information of a received packet.

On the other hand, Diffserv (differentiated services) is stated in RFC 2475 of IETF (Internet engineering task force) (related art 3). Using FIG. 2, we explain related art 3. Company networks 221, 222, 223, and 224 are mutually connected by the DS domain 225. The DS domain 225 executes the QoS control based on a policy such as TELNET is preferentially processed. As a result, QoS that contracts in advance between the enterprise network users and an administrator of DS domain 225, is provided. The DS domain 225 is composed of boundary node 226 and boundary node 227 that are positioned in the edge of the DS domain 225 and interior node 228 that is positioned in the core of the DS domain 225. Interior node 228 has much flow. And high-speed lines are connected to interior node 228. Therefore, interior node 228 may not be able to perform QoS control with high speed. Diffserv is a solution to that problem. The Interior node has only limited function because the load of the interior node is higher than that of the boundary node.

Suppose that a packet is transmitted from company network 221 to company network 224. When boundary node 226 receives a packet from company network 221, flow detection means (It is called Classifier in RFC 2475) of boundary node 226 performs flow detecting using the source/destination IP address, the source/destination port number, and the protocol in the TCP/IP header as flow condition. And it decides priority of the packet in the DS domain 225 and writes the priority into the DS field of the packet header. Boundary node 227 and interior node 228 with high load, performs flow detecting and QoS control with high speed based on only DS field value.

SUMMARY OF THE INVENTION

In this specification, a network that Diffserv is applied is called a Diffserv network. At the time of shifting to a Diffserv network, there is less possibility of replacement of all existing routers simultaneously because it is required to reduce the cost and the risk following the replacement to a minimum. Therefore, to shift to the Diffserv network smoothly, it is expected that the shift consist of two stages, that is "transition stage" and "practical use stage".

Transition Stage

It is called "hot spot" that the point in the network that packet discard or increase of transmission delay happens. The router positioned hot spot will be replaced with a router with the powerful QOS control selectively. To reduce a hot spot will improve communication quality.

The router in the transition stage is required a function that performs flow detecting using the source/destination IP address, the source/destination port number, and the protocol in the TCP/IP header as flow condition, and decides the priority of the packet. In this specification, we call this function "Diffserv Mode 1".

Practical Use Stage

In the transition stage, when the replacement to a router with QoS control advances, QoS of the network will improve. When most of routers are replaced to a router with QoS control, the network administrator of the DS domain will start application of the Diffserv network. A router used as an interior node in this stage will be required a function that judges priority information by the DS field. In this specification we call this function "Diffserv Mode 2".

On the other hand, a router used as a boundary node in this stage will be required followings. A router at the exit of the DS domain will be required Diffserv FUNCTION 2. And a router at the entrance of the DS domain 225 will be required a function that executes flow detecting using the source/destination IP address, the source/destination port number, and the protocol in the TCP/IP header as flow condition, and judges the priority of the packet and renewing the DS field in accordance with the result of flow detecting. The function is called "Diffserv Mode 3" in this specification.

Therefore, to shift Diffserv network smooth, a router used as an interior node will be required to support "Diffserv Mode 1" and "Diffserv Mode 2", and switch the functions in accordance with the stage.

A router used as a boundary node will be required to support "Diffserv Mode 1", "Diffserv Mode 2" and "Diffserv Mode 3", and do switching with the functions in accordance with the stage. In practical use stage, a router used as a boundary node will be required to support "Diffserv Mode 2" and "Diffserv Mode 3", and do switching the functions. Furthermore, in practical use stage, the Diffserv function switching will be executed in accordance with position in the DS domain 225 such as the edge node or the core node. For example, boundary node A226 will have to apply Diffserv Mode 3 to an input packet from company network 221 and Diffserv Mode 2 to an input packet from interior node 228.

On the other hand, interior node 228 will have to apply Diffserv Mode 3 to all input packets. Moreover, an interior node executes "Diffserv Mode 2" at high speed because high-speed lines are connected to an interior node.

However, related art 3 does not teach such viewpoints at all.

The object of present invention is to present a router that can do switching with Diffserv Mode 1 and Diffserv Mode 2.

Another object of present invention is to present a router that that can do switching with Diffserv Mode 1, Diffserv Mode 2 and Diffserv Mode 3.

Another object aim of present invention is to present a router that can do switching with Diffserv Mode 2 and Diffserv Mode 3.

Another object of present invention is to present a router that can do Diffserv mode switching in accordance with the position in the DS domain 225 and/or DS domain 225 architecture.

Another object of present invention is to present a router that can execute "Diffserv Mode 2" at high-speed.

To achieve the object, a packet communication system of the present invention has at least two modes to apply an input packet of first mode, second mode and third mode, the first mode being a mode that decides priority of the packet by at least one of the address information and the application information, the second mode being a mode that decides priority of the packet by the DS value, the third mode being a mode that decides rewrite the DS value by at least one of the address information and the application information. A control unit of the packet communication system switches a mode to apply an input packet of the modes based on the packet header information of the input packet.

DETAILED DESCRIPTION OF THE PREFERRED EMBODIMENT

Embodiment 1

Figure 1:
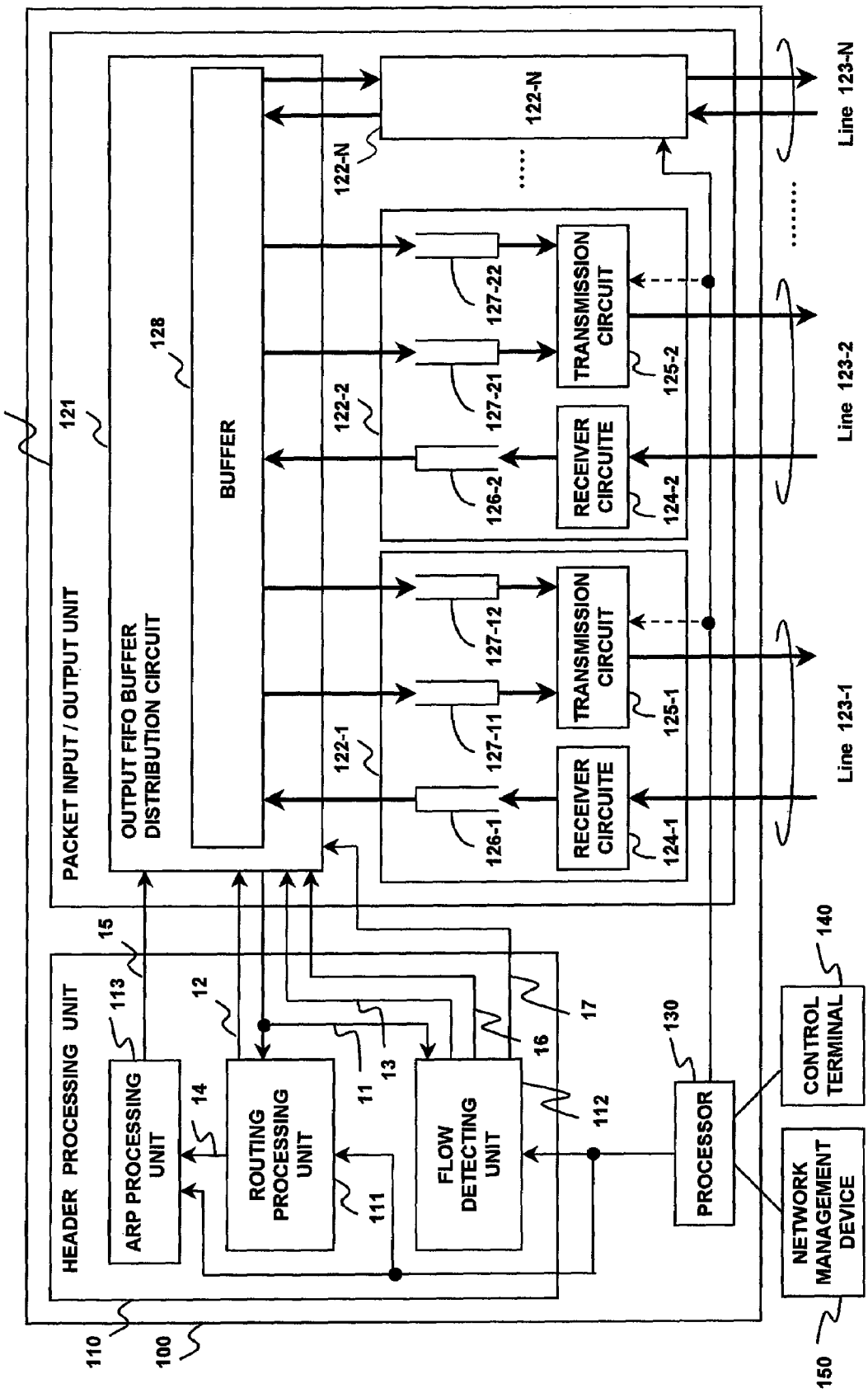
FIG. 1 is a block diagram of a router of a first embodiment of the present invention.

FIG. 1 is a block diagram of a router of a first embodiment of the present invention. Router 100 has header processing unit 110, packet input/output unit 120 for transferring a packet, and processor 130. The header processing unit 110 has ARP processing unit 113 for performing ARP (Address Resolution Protocol) processing, routing processing unit 111 for performing routing processing and flow detecting unit 112 for detecting flow. The packet input/output unit 120 has output FIFO (First In First Out) buffer distribution circuit 121, line interfaces 122-$i$ ($i=1, \ldots, N$) and lines 123-$i$ ($i=1, \ldots, N$). Control terminal 140 and network management equipment 150 are connected to the processor 130.

Figure 3:
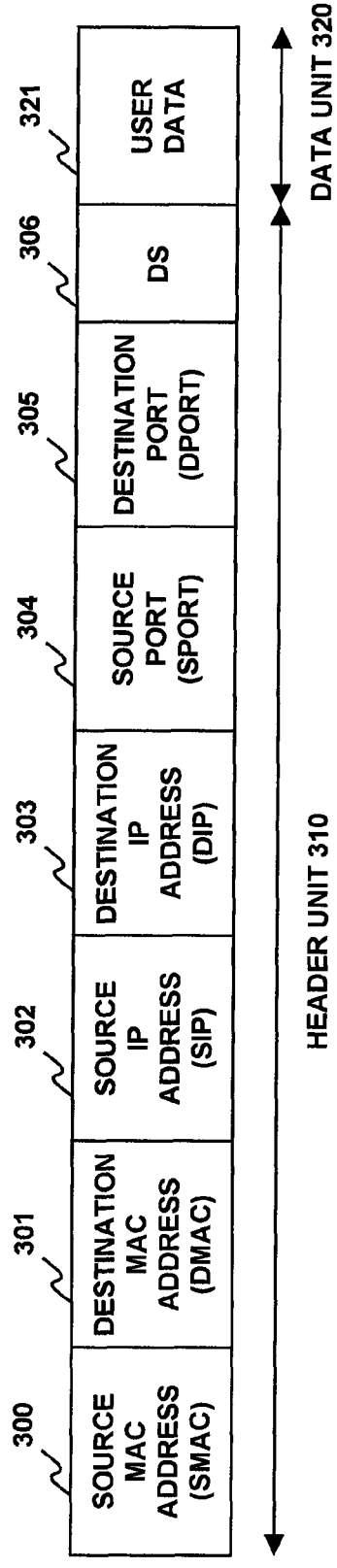
FIG. 3 is an example of a packet format used by a network of the present invention.

FIG. 3 is an example of a packet format used by a network of the present invention. The packet format provides packet header unit 310 and data unit 320. The header unit 310 provides source MAC (Media Access Control) address (SMAC) field 300, destination MAC address (DMAC) field 301, source IP (Internet Protocol) address (SIP) field 302, destination IP address (DIP) field 303, source port (SPORT) field 304, destination port (DPORT) field 305, and DS (Differentiated Service) field 306. SMAC shows the physical address (hardware address) of the last router that transferred the packet, and DMAC shows the physical address (hardware address) of the next router where the packet is transferred. SIP shows the IP address of the source terminal that transfers the packet, and DIP shows the IP address of the destination terminal where the packet is transferred. SPORT and DPORT show the protocol, that is, the host application program. DS shows the priority of the packet in DS domain 225. The data unit 320 provides user data field 321. The header unit 310 also comprises information on upper protocol over IP, which may be handled like the information mentioned above. Moreover, although FIG. 3 shows the packet format that the protocol of transport layer is TCP (Transmission Control Protocol) or UDP (User Datagram Protocol) and the protocol of network layer is IP, a protocol of transport layer or network layer may be another protocol. For example, a protocol of network layer may be IPX (Internetwork Packet Exchange).

Figure 4:
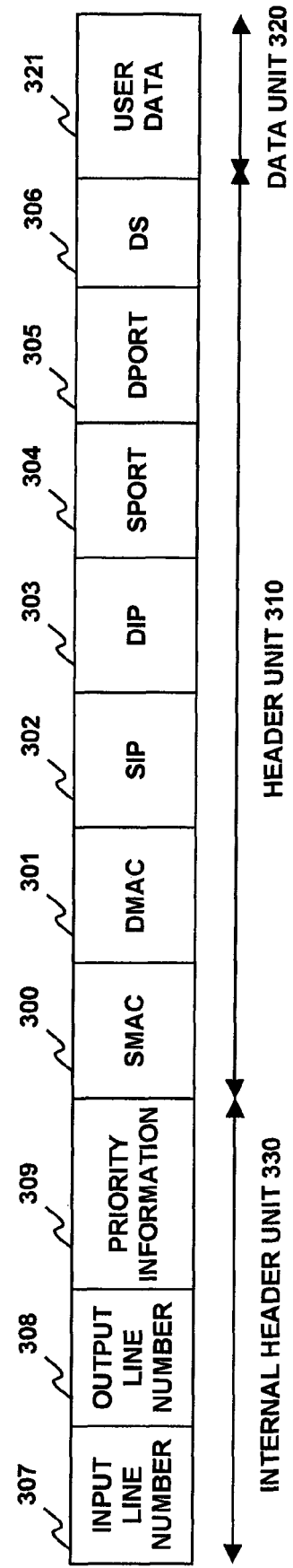
FIG. 4 is an example of an internal packet format used by a router of the present invention.

FIG. 4 is an example of an internal packet format used by a router 100 of the present invention. The packet format is that interior header unit 330 is added to the packet format shown in FIG. 3. The interior header unit 330 is comprised of input line number 307, output line number 308, and priority information 309. The input line number 307 shows the number of line where the packet was inputted, and the output line number 308 shows the number of line where the packet is outputted. The priority information 309 is used in performing priority transfer. Another format analogous to the format shown in FIG. 4 may be used.

We refer to FIG. 1 again. When a packet is inputted from input line 123-$i$, receiver circuit 124-$i$ transforms the packet into the internal packet format shown in FIG. 4, wherein the receiver circuit 124-$i$ provides the input line number i to the input line number 307 of the internal packet format. After that, the receiver circuit 124-$i$ transmits the interior packet to input FIFO buffer 126-$i$. At this time, the output line number 308 and the priority information 309 of the internal packet have no meanings yet. The input FIFO buffer 126-$i$ stores packets, and transmits them to output FIFO buffer distribution circuit 121 in order of arrival. The output FIFO buffer distribution circuit 121 stores the packets into buffer 128 and transmits header information 11, which is composed of header unit 310 and internal header unit 330, to the header processing unit 110.

The routing processing unit 111 retrieves the routing table in the unit, which is not shown in FIG. 1, according to the DIP 303 of the header information 11. Due to the retrieval, the routing processing unit 111 decides the output line information 12 to transmit the packet to the sub-net that the DIP belongs to and the IP address of the next router, that is NIP (Next Hop IP Address) information 14. The processor 130 provides and manages the routing table. Japanese Unexamined Patent Publication Disclosure 10(1998)-222535 discloses retrieval of a routing table. Routing processing unit 111 transmits the output line information 12 to the output FIFO buffer distribution circuit 121 and transmits NIP information 14 to ARP processing unit 113. When the output FIFO buffer distribution circuit 121 receives the output line information 12, the output FIFO buffer distribution circuit 121 provides the output line information 12 to the output line number 308 of the packet stored in the buffer 128.

When the ARP processing unit 113 receives the NIP information 14, the ARP processing unit 113 decides the DMAC information 15 corresponding to the NIP information 14 and outputs the DMAC information 15 to the output FIFO buffer distribution circuit 121. When the output FIFO buffer distribution circuit 121 receives the DMAC information 15, the output FIFO buffer distribution circuit 121 provides the DMAC information 15 to the DMAC 301 of the packet stored in the buffer 128.

On the other hand, flow detecting unit 112 retrieves entry table 850, decides priority information 13 for priority transmission, DS rewriting effective information 16 for indicating execution/not execution of rewriting DS and rewrite DS information 17 and output them to the output FIFO buffer distribution circuit 121.

When the output FIFO buffer distribution circuit 121 receives the priority information 13, the output FIFO buffer distribution circuit 121 provides the priority information 13 to the priority information 309 of the packet stored in the buffer 128. And when the output FIFO buffer distribution circuit 121 receives the DS rewriting effective information 16 and the DS information 17, the output FIFO buffer distribution circuit 121 rewrites the DS 306 to the DS information 17 if the DS rewriting effective information 16 indicates the effective, and does not rewrite the DS 306 if not so. After that, the output FIFO buffer distribution circuit 121 decides the line interface 122-$k$ ($k=1, \ldots, N$) based on the output line number 308 and output FIFO buffer 127-$kj$ ($j=1, 2$) on the line interface 122-$i$ based on the priority information 309. In this embodiment, the output FIFO buffer 127-$k1$, 127-$k2$ are for high priority and low priority respectively. The output FIFO buffer 127-$kj$ stores the packet. Transmission circuit 125-$k$ controls the readout from the output FIFO buffer 127-$kj$. The readout control may be complete priority, weighted round robin, and so on. In the complete priority, if packets is stored in the output FIFO buffer 127-$k1$ for high priority, the packets are read out in order of arrival. If no packet, packets stored in the output FIFO buffer 127-$k2$ for low priority are read out in order of arrival. On the other hand, in the weighted round robin, packets stored in FIFO buffer 127-$k1$ and packets stored in FIFO buffer 127-$k2$ are read out based on a predetermined ratio. The control in the transmission circuit 125-$k$ is set up by the network management device 150 or control terminal 140. The transmission circuit 125-$k$ cancels the internal header unit 330, provides the MAC address allocated to line 123-$k$ to the SMAC 301 and transmits the packet to the line 123-$k$.

Figure 8:
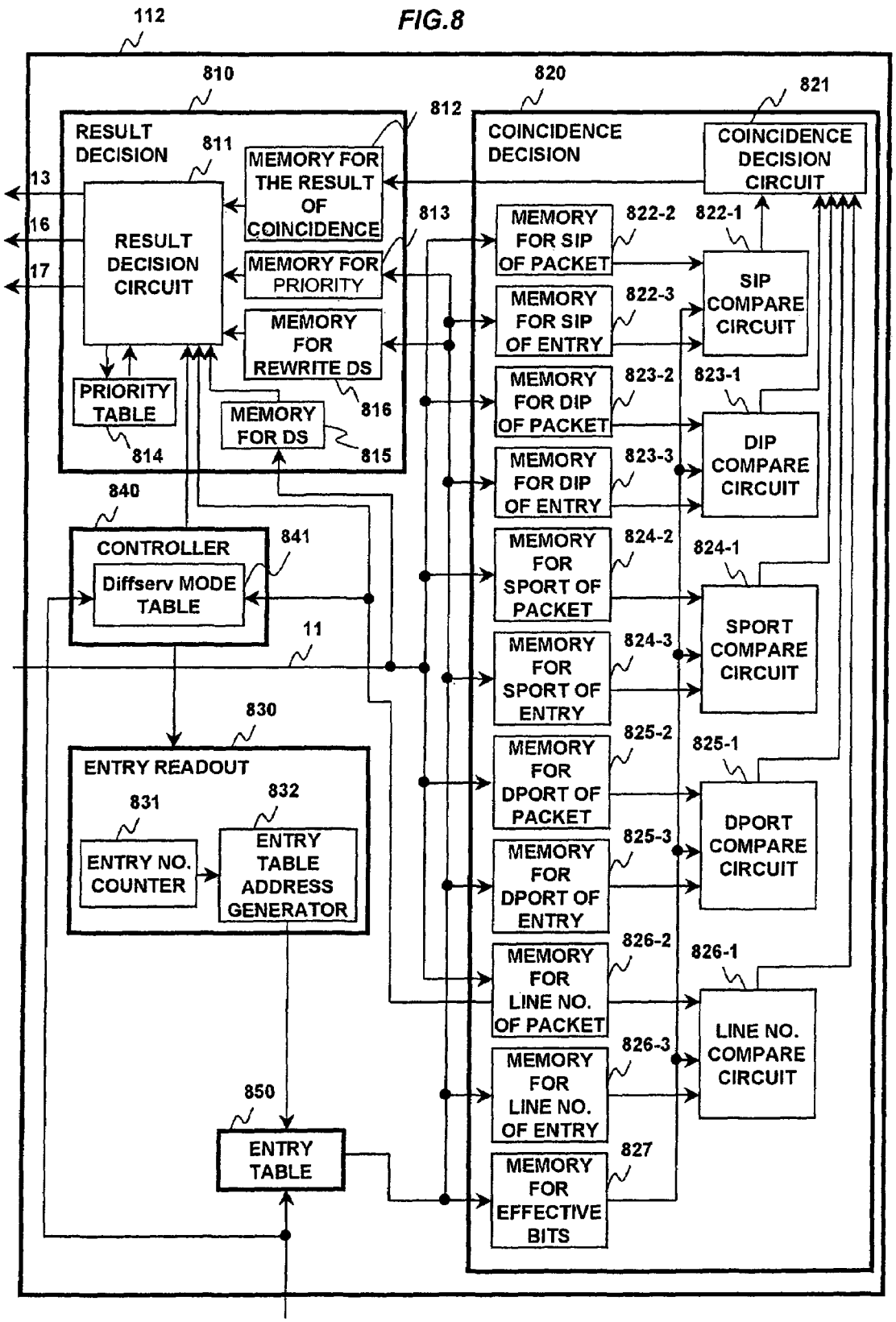
FIG. 8 is a block diagram of a flow detecting unit of an embodiment of the present invention, showing a condition that a Diffserv mode is set up in input line units.

Next, we explain detailed operation of the flow detecting unit 112. FIG. 8 is a block diagram of the flow detecting unit 112 of an embodiment of the present invention. The flow detecting unit 112 has result decision unit 810, coincidence decision unit 820, entry readout unit 830, controller 840 and entry table 850. The controller 840 has Diffserv mode table 841 that is used in setting up mode 1, 2, and 3 in input line units and Diffserv mode decision unit that decides the Diffserv mode based on the input line number.

Figure 10:
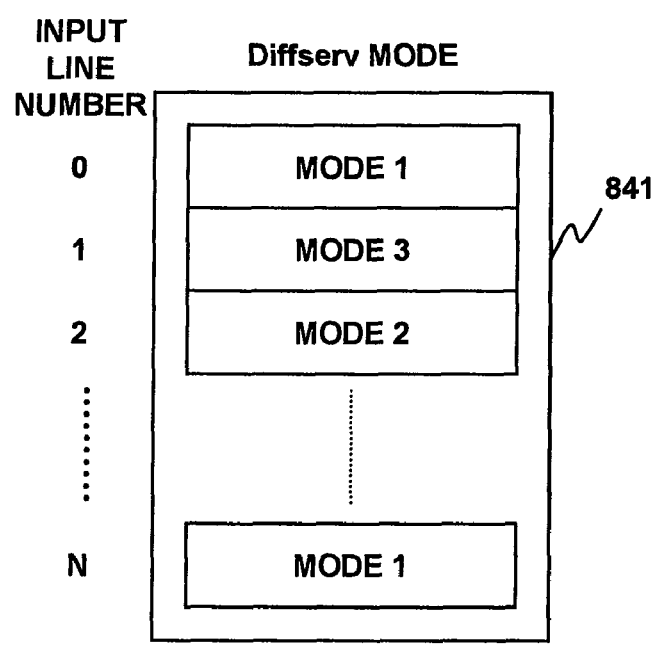
FIG. 10 is an example of a format of Diffserv mode table.

FIG. 10 is an example of a format of Diffserv mode table 841. Mode 1 is a preferable mode to be realized the transition stage. In Mode 1, the Diffserv Mode 1 is applied to the flow detecting unit 112. That is, the flow detecting unit 112 performs flow detecting using the source/destination IP address, the source/destination port number, and the protocol in the TCP/IP header as flow condition, and decides the priority of the packet. Mode 2 and Mode 3 are preferable modes to be realized the practical use stage. In Mode 2, Diffserv Mode 2 is applied to the flow detecting unit 112. That is, the flow detecting unit 112 judges priority information of a packet by the DS field of the packet. In Mode 3, Diffserv Mode 3 is applied to the flow detecting unit 112. That is, the flow detecting unit 112 performs flow detecting using the source/destination IP address, the source/destination port number, and the protocol in the TCP/IP header as flow condition, and judges the priority of the packet and renewing the DS field in accordance with the result of flow detecting. Administrator of DS domain 225 can build the Diffserv mode table 841 using the control terminal 140 or the network management device 150 through the processor 130.

Figure 6:
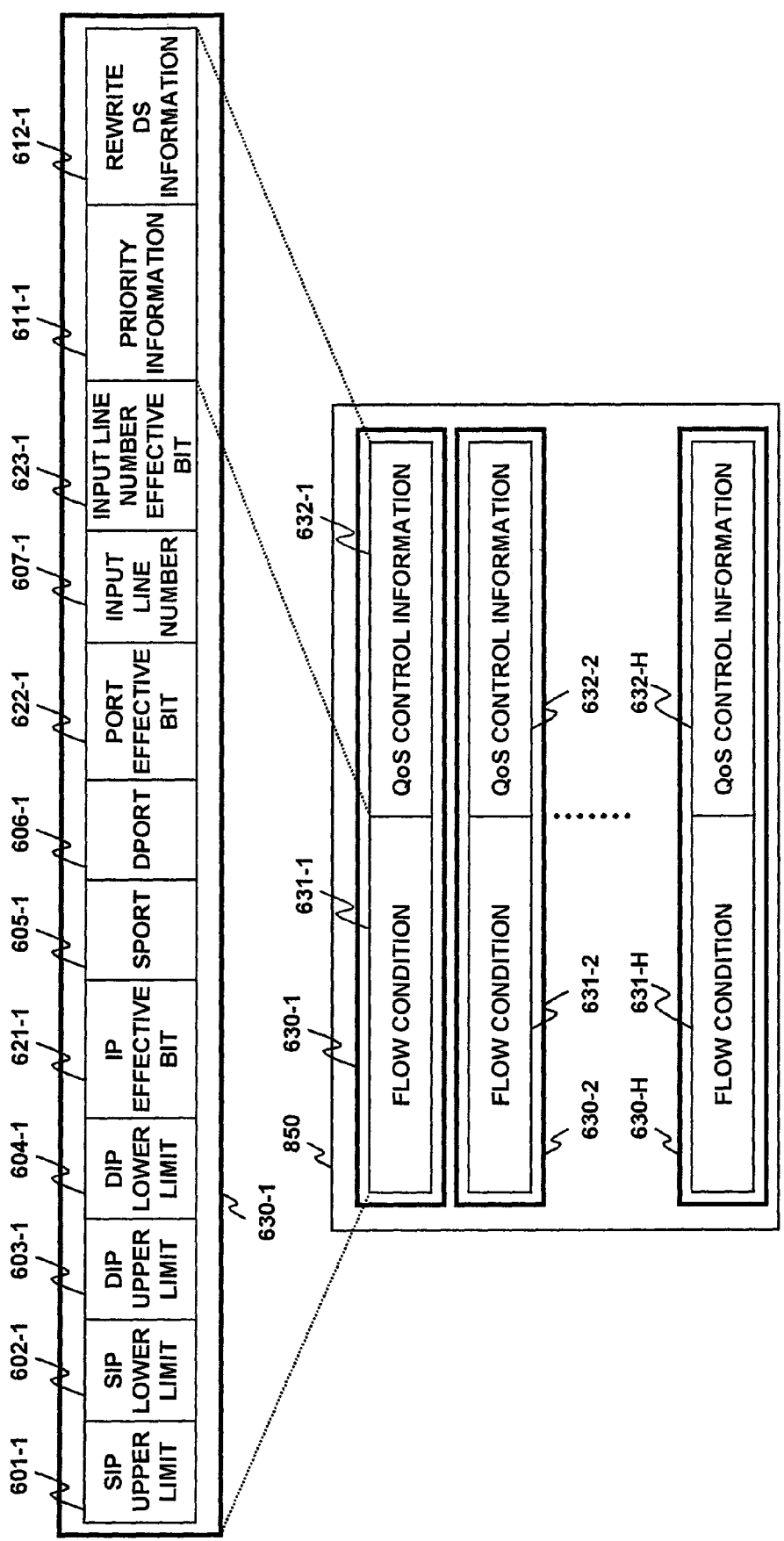
FIG. 6 is a format of an entry table of a first embodiment of the present invention, showing a condition wherein a Diffserv mode is set up in input line units.

FIG. 6 shows a format of an entry table 850. The entry table 850 has H entries 630. Each of the entries has flow condition 631 and QoS control information 632. The QoS control information 632 is composed of priority information 611 for a priority transfer and rewrite DS information 612. The flow condition 631 is composed of a condition to distinguish the source or the destination of the packet and a condition to distinguish the protocol.

Figure 2:
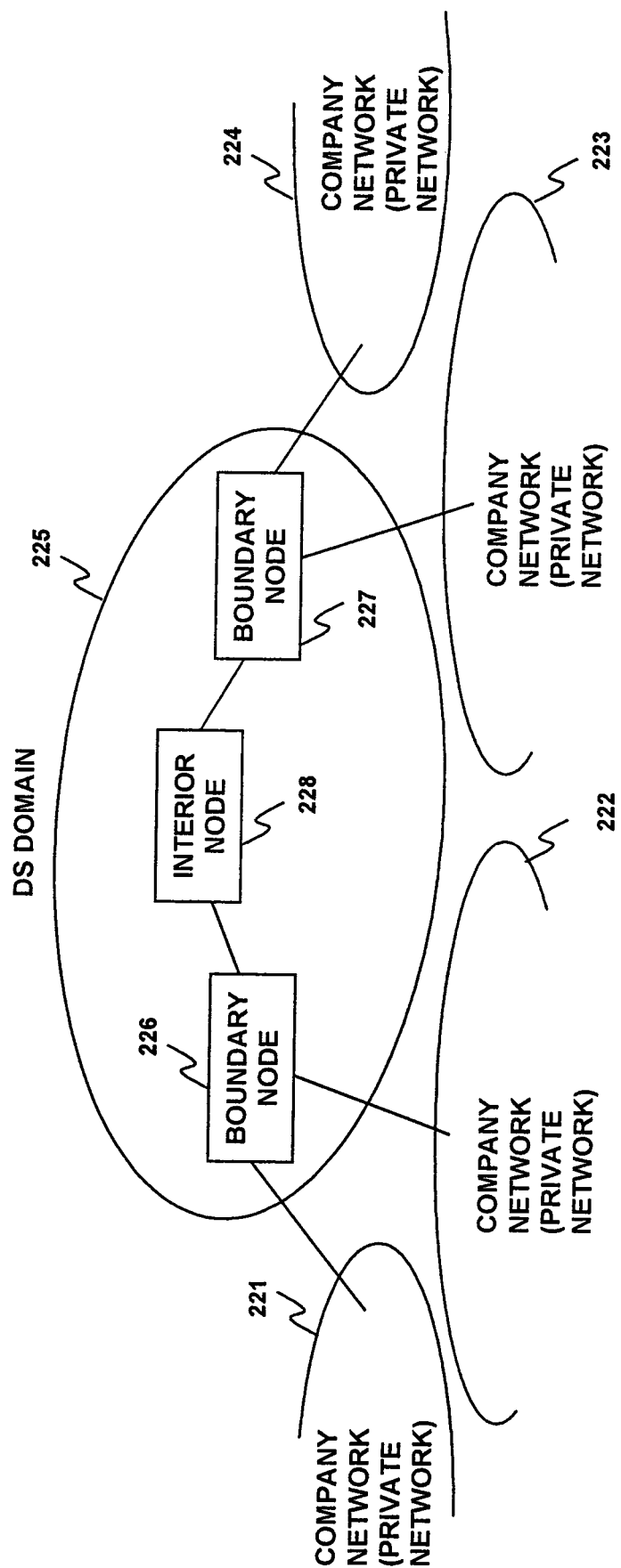
FIG. 2 is a schematic view for explaining Diffserv network.

The flow condition to distinguish the source or the destination of the packet is SIP upper limit 601, SIP lower limit 602, DIP upper limit 603, DIP lower limit 604, IP effective bit 621 to indicate that the upper and lower limit of SIP and DIP are effective, input line number 607 and input line number effective bit 623 to indicate that input line number 607 is effective. The boundary node 226 and the boundary node 227 shown in FIG. 2 can understand which transferred the packet of the company networks from 221 through 224 by the input line number. A subnet, which means a domain of IP network divided by a subnet mask, can be designate by only an entry 630 if the upper limit and lower limit of SIP or DIP is set up.

Figure 5:
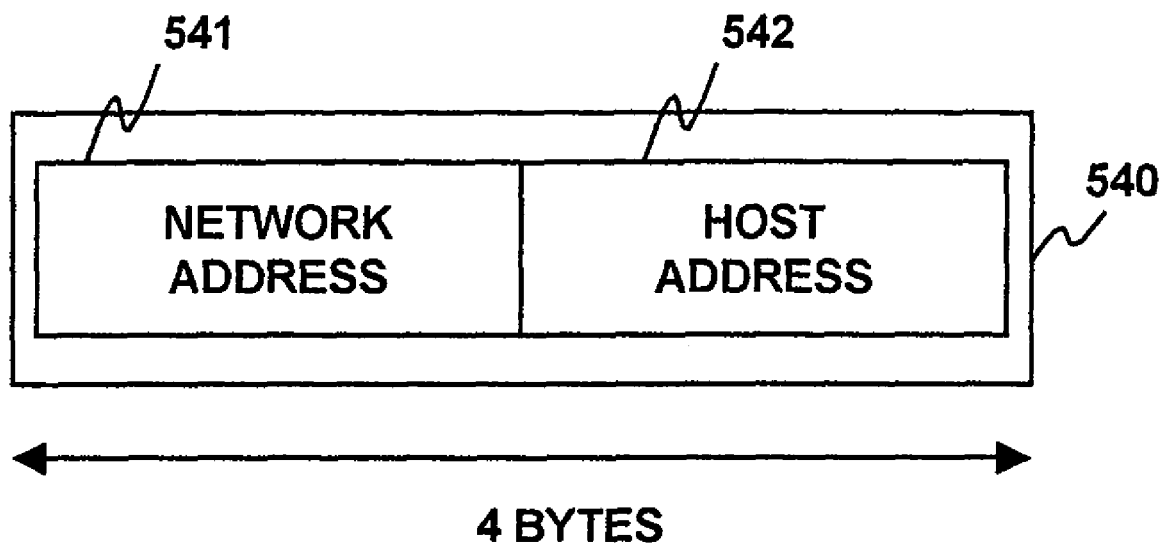
FIG. 5 is IP address format.

FIG. 5 shows IP address format. IP address 540 is composed of network address 541 and host address 542. A subnet is distinguished by the network address 541 and a terminal in the subnet by the host address 542. As the high-order bits of the IP address 540 designates a network address, the terminals in the network have continuous IP addresses respectively. Therefore, a range of IP addresses defined by an upper limit and an lower limit can designate the terminals.

The flow condition to distinguish the protocol is SPORT 605 to indicate a source port, DPORT 606 to indicate a destination port and port effective bit 622 to indicate that the SPORT 605 and the DPORT 606 are effective. If the flow detecting is performed with IP address, port number and input line number, then "Effective" is set to the IP effective bit 621, the port effective bit 622 and the input line number effective bit 623 respectively; otherwise, then "Invalid" is set respectively.

Figure 7:
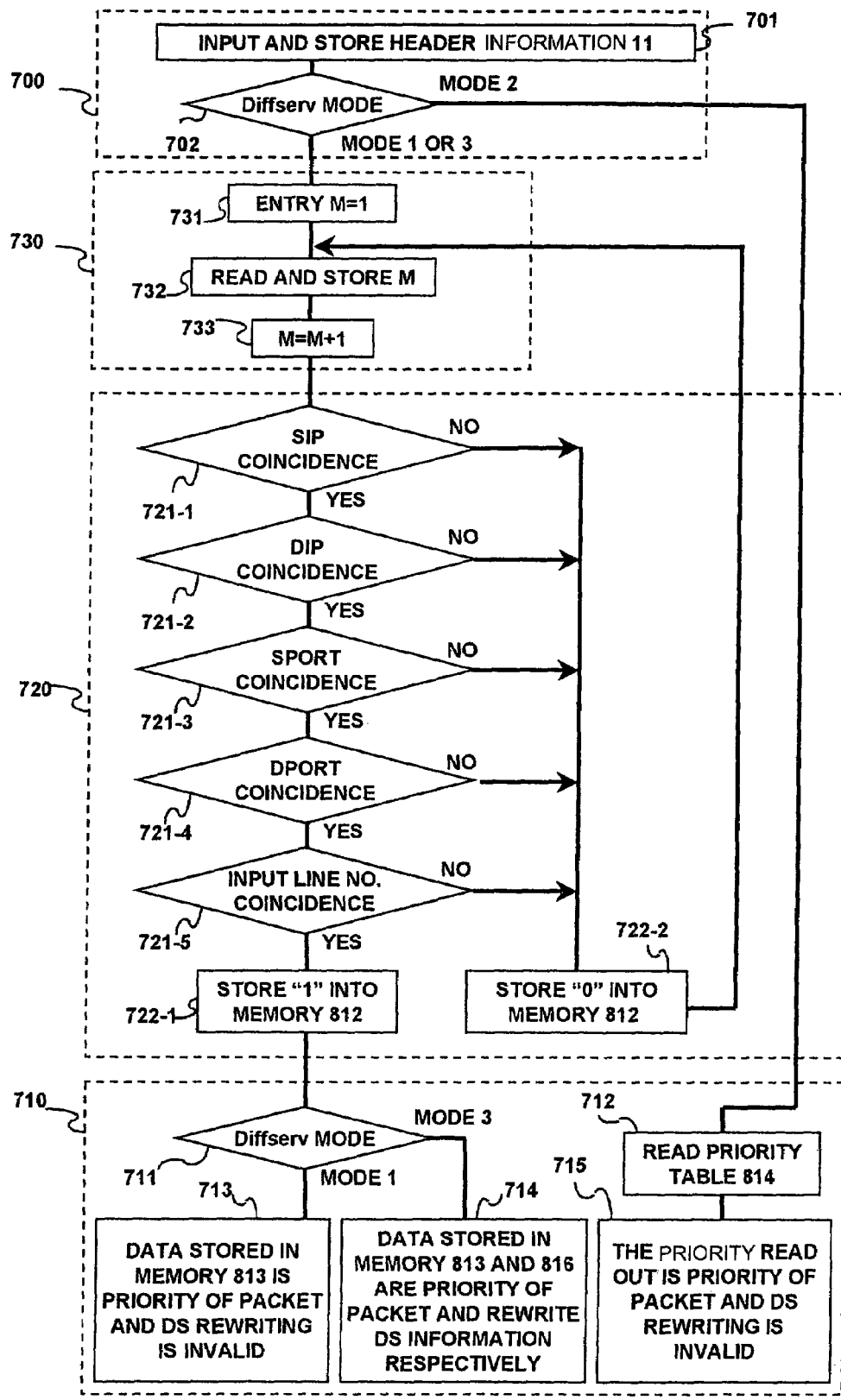
FIG. 7 is a flowchart of a first embodiment of the present invention, showing a condition that a Diffserv mode is set up in input line units.

FIG. 7 shows a flowchart for explaining the processing of the flow detecting unit 112. The processing of the flow detecting unit 112 is roughly divided into four parts. Those are detecting starting processing 700, entry readout processing 730, condition coincidence deciding 720 and result deciding 710. The entry readout processing 730, the condition coincidence deciding 720 and the result deciding 710 are performed by entry readout unit 830, coincidence decision unit 820 and result decision unit 810 respectively, which are shown in FIG. 8.

We explain the processing of the flow detecting step by step referring FIG. 7 and FIG. 8, which shows a block diagram of a flow detecting unit 112. In the detecting starting processing 700, when the header information 11 of the packet is transmitted to the header processing unit 110, the flow detecting unit 112 stores the input line number 307, SIP 302, DIP 303, SPORT 304, DPORT 305 and DS 306 into memory for line No. of packet 826-2, memory for SIP of packet 822-2, memory for DIP of packet 823-2, memory for SPORT of packet 824-2, memory for DPORT of packet 825-2 in the coincidence decision unit 820 and memory for DS in result decision unit 810 respectively (Step 701). Diffserv mode decision unit (no illustration) in controller 840 decides that it is the Diffserv mode that the corresponding value of Diffserv mode table 841 to the input line number of the memory for line No. of packet (Step 702). In Mode 1 or Mode 3, the Diffserv mode decision unit transmits a start signal to the entry readout unit 830 (no illustration).

The processing in Mode 1 or Mode 3 is as follows. In the entry readout processing 730, when receiving the start signal, the entry readout unit 830 sets the number "M" of entry No. counter for "1" to read out the first entry 630-1 of the entry table 850 (Step 731). Then, entry table address generator 832 generates an address of the entry table 850 based on the value of M, reads out the entry 630. Moreover, the entry table address generator 832 transmits the SIP upper limit 601-1 and the SIP lower limit 602-1 of the entry to memory for SIP of entry 822-3, the DIP upper limit 603-1 and the DIP lower limit 604-1 of the entry to memory for DIP of entry 823-3, SPORT 605-1 of entry to memory for SPORT of entry 824-3, DPORT 606-1 of entry to memory for DPORT of entry 825-3 and the IP effective bit 621-1, the port effective bit 622-1 and the input line number effective bit 623-1 to memory for effective bit 827. And the entry table address generator 832 transmits the priority information 611-1 and the rewrite DS information 612-1 to memory for priority 813 and memory for rewrite DS 816 in the result decision respectively (Step 732). Then, The value of M is incremented by one to read out the second entry 630-2 of the entry table 850 at next entry readout processing (Step 733).

In the condition coincidence decision processing 720, the coincidence decision 820 decides whether the input packet agree with the flow conditions stored in the memory for SIP of entry 822-3, the memory for DIP of entry 823-3, the memory for SPORT of entry 825-3, the memory for DPORT of entry 826-3 and the memory for line No. of entry 826-3.

SIP compare circuit 822-1 compares SIP upper limit 601 and SIP lower limit 602 stored in the memory for SIP of entry 823-3 with SIP stored in the memory for SIP of entry 822-3. If the SIP satisfies the condition such that
SIP lower limit 601 $\leq$ ... SIP $\leq$ ... SIP upper limit 602,
or IP effective bit 621 is "Invalid", then SIP compare circuit 822-1 decides to be coincidence (step 721-1). DIP compare circuit 823-1 performs a processing like SIP compare circuit 822-1 to DIP (step 721-2). If SPORT stored in memory for SPORT of packet 823-2 with SPORT 605 stored in memory for SPORT of entry 823-3 or PORT effective bit 622 is "Invalid", then SPORT compare circuit 824-1 decides to be coincidence (step 721-3). DPORT compare circuit 825-1 performs a processing like SPORT compare circuit 824-1 to DPORT (step 721-4). If input line number stored in memory for line No. of packet 826-2 with input line No. 607 stored in memory for line No. of entry 826-3 or input lien number effective bit 623 is "Invalid", then Line No. compare circuit 826-1 decides to be coincidence (step 721-5).

If all decisions of the steps from step 721-1 through step 721-5 are coincidence, then "1" indicating coincidence is stored into memory for the result of coincidence 812 (step 722-1); otherwise "0" indicating mismatch is stored into it (step 722-2). If "1" is stored in memory for the result of coincidence 812, then result decision unit 810 performs the result deciding 710. If "0" is stored in it, then return to step 732.

In the result deciding 710, result decision circuit 811 operates in accordance with the Diffserv Mode decided in step 704. If Diffserv Mode is Mode 1, then the data stored in memory for priority 813 is the priority of the packet and result decision circuit 811 transmits the data as priority information 13 to output FIFO buffer distribution circuit 121. In this case result decision circuit 811 transmits DS rewriting effective information 16 that indicates that DS rewriting is invalid to output FIFO buffer distribution circuit 121 (step 713). On the other hand, if Diffserv Mode is Mode 3, then the data stored in memory for priority 813 is the priority of the packet and result decision circuit 811 transmits the data as priority information 13 to output FIFO buffer distribution circuit 121. Moreover the data stored in memory for rewrite DS 816 is rewrite DS information and result decision circuit 811 transmits the data as rewrite DS information 17 and DS rewriting effective information 16 that indicates that DS rewriting is valid to output FIFO buffer distribution circuit 121 (step 714).

We explain the case that Diffserv Mode is Mode 2. In Mode 2, Diffserv Mode 2 is applied to interior node 228 with high load. Entry readout processing 730 and condition coincidence deciding 720 are bottleneck of speed-up of flow detecting if flow conditions increases. Therefore, to make interior node 228 handle a packet at high speed, flow detecting unit 112 skips entry readout processing 730 and condition coincidence deciding 720, thereby performs flow detecting at high speed.

Figure 9:
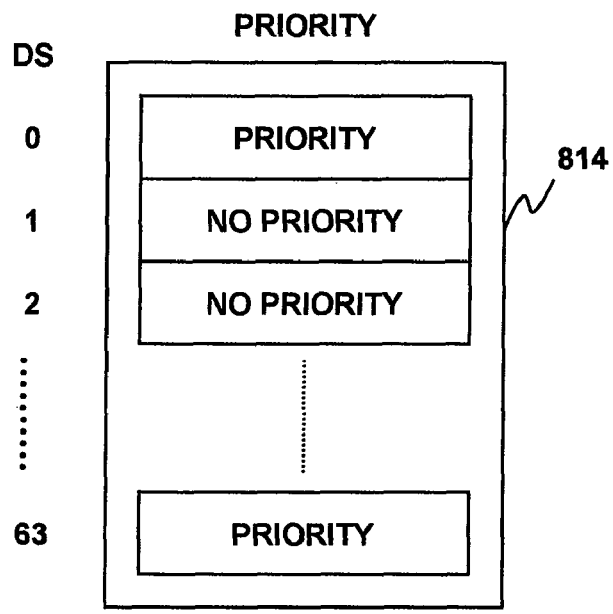
FIG. 9 is an example of a format of priority table.

If Diffserv Mode is Mode 2 in step 702, then result decision circuit 811 reads out the data corresponding to DS stored in memory for DS 815 from priority table 814 shown in FIG. 9 (step 712). In this case the data read out from priority table 814 is the priority of the packet. Result decision circuit 811 transmits the data as priority information 13 and DS rewriting effective information 16 that indicates that DS rewriting is invalid to output FIFO buffer distribution circuit 121 (step 715). Since DS is information of 6 bits, priority table 814 has 64 kinds of data at most. Accordingly, flow detecting is performed at high speed.

In the embodiment of the present invention, Diffserv Modes are stored in diffserv Mode table 841, thereby Diffserv Mode 1, Diffserv Mode 2 and Diffserv Mode 3 are implemented. The table facilitates changing Diffserv Modes by an administrator of DS domain 225 or network management device 150. Therefore, A router of the present invention is applicable to a boundary node and/or an interior node of a Diffserv network in the transition stage and/or the practical use stage.

Embodiment 2

In Embodiment 1, Diffserv Mode is set in every input line units as shown in FIG. 6. To change Diffserv mode more flexibly, it is preferable to set Diffserv Mode in entry units, that is, in flow units. Hereinafter, we mainly explain the deference between embodiment 1 and embodiment 2.

Figure 11:
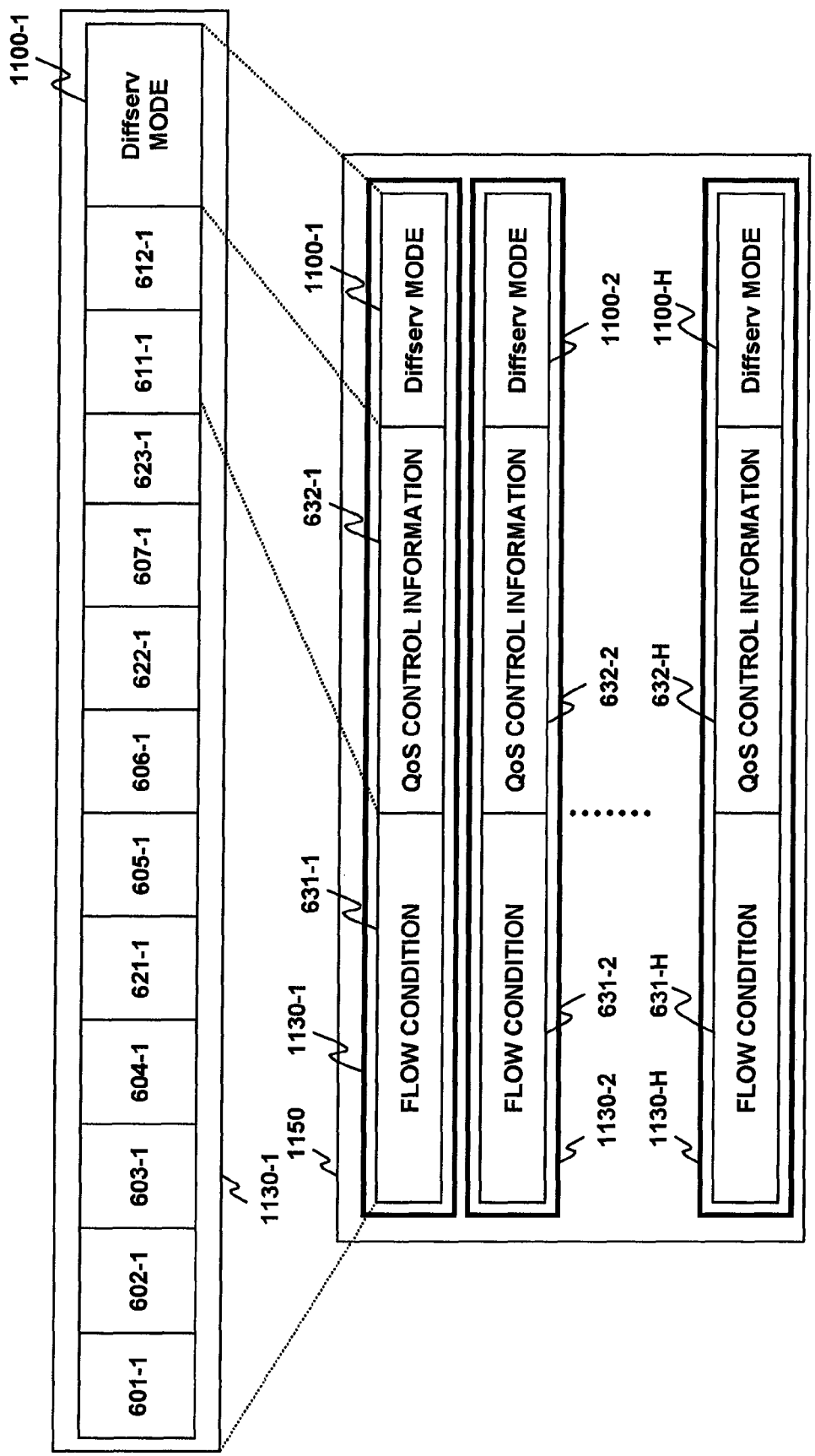
FIG. 11 is a format of an entry table of a second embodiment of the present invention, showing a condition that a Diffserv mode is set up in entry units.

FIG. 11 shows a format of entry table 1150 which replaces entry table 850 shown in FIG. 6 and FIG. 8. As shown FIG. 11, Diffserv Mode 1100 is added to each of entries 630. An administrator of DS domain 225 sets up Diffserv Mode 1100 by control terminal 140. The setting may be performed by network management device 150.

Figure 12:
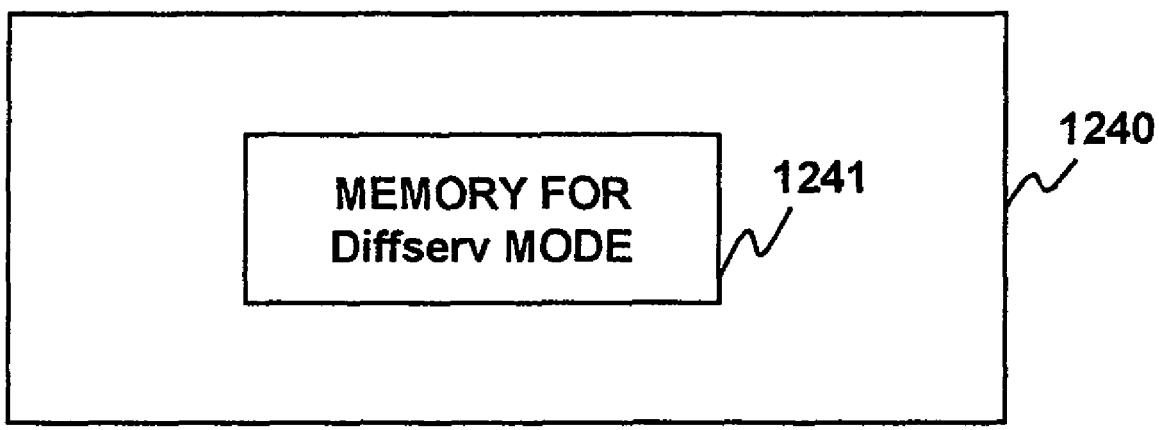
FIG. 12 is a block diagram of controller of a second embodiment of the present invention, showing a condition that a Diffserv mode is set up in entry units.

FIG. 12 shows controller 1240 which replaces controller 840 in FIG. 8. Controller 1240 has memory for Diffserv Mode 1241 in stead of Diffserv Mode table 841.

Figure 13:
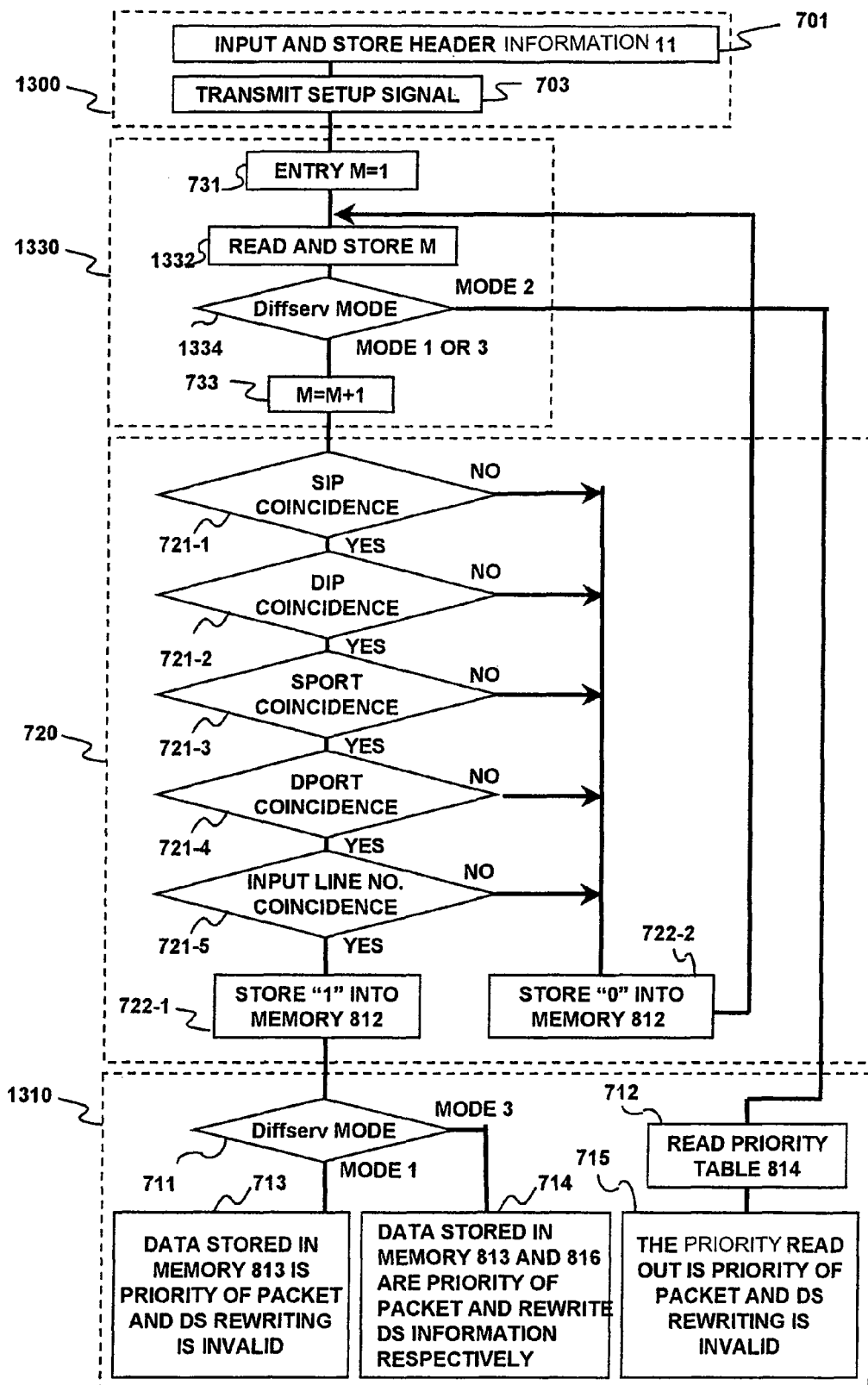
FIG. 13 is a flowchart of a second embodiment of the present invention, showing a condition that a Diffserv mode is set up in entry units.

FIG. 13 shows a flowchart for explaining the processing of the flow detecting unit 112 of embodiment 2. In step 1332 in entry readout processing 1330, processing of storing Diffserv Mode 1100 in memory for Diffserv Mode 1241 is added to step 732 in FIG. 7. In step 1334, Diffserv Mode is decided by the value stored in memory for Diffserv Mode 1241.

As above-mentioned, the present invention provides a router that is useful in shifting to Diffserv network.

Although the present invention has been described in connection with a preferred embodiment thereof, many other variations and modifications will now become apparent to those skilled in the art.

What is claimed is:

1. A packet communication device for transmitting a packet, said packet having header information including address information, a port information, and a DS (Differentiated Services) value, comprising:
    a plurality of input lines;
    a plurality of output lines;
    a switching unit connected to said input lines and said output lines, said switching unit outputting said packet from an input line of said plurality of input lines to an output line of said plurality of output lines; and
    a control unit for switching a mode to apply to the packet among a first mode and a second mode based on the header information,
    said first mode being a mode that decides priority of the packet by the DS value,
    said second mode being a mode that decides priority of the packet by at least one of the address information and the port information, and decides to write the DS value, by at least one of the address information and the port information.

2. The packet communication device according to claim 1, wherein
    said control unit comprises a table indicating which mode to apply to each of the input lines of the first mode and the second mode, and
    said control unit decides the mode to be applied to the packet according to the table.

3. The packet communication device according to claim 1, wherein the packet is an IP (Internet Protocol) packet and the address information is a source IP address.

4. The packet communication device according to claim 1, wherein the packet is an IP (Internet Protocol) packet and the application information is a TCP (Transmission Control Protocol) port number.

5. The packet communication device according to claim 1, wherein the first mode or the second mode is set in each of the input lines.

6. A QoS (Quality of Service) control method for a packet communication device, an inputted packet having header information including address information, port information, and DS (Differentiated Services) value comprising:
    a mode selecting step for selecting one of a first mode and a second mode;
    wherein said first mode comprises a step of deciding priority of the inputted packet by DS value;
    said second mode comprises a step of deciding priority of the packet by at least one of the address information and the port information and a step of deciding to write the DS value, by at least one of the address information and the port information.

7. The QoS (Quality of Service) control method according to claim 6, wherein said first mode comprises a first step for making a decision about a coincidence between header information of the inputted packet and a flow condition and a second step for executing QoS control based on a data corresponding to the flow condition.

8. The QoS (Quality of Service) control method according to claim 6, wherein said mode selecting step includes the step of making a selection for each packet based on the port number to which said packet is related.

9. The QoS (Quality of Service) control method according to claim 6, wherein the packet is an IP (Internet Protocol) packet and the address information is a source IP address.

10. The QoS (Quality of Service) control method according to claim 6, wherein the packet is an IP (Internet Protocol) packet and the application information is a TCP (Transmission Control Protocol) port number.

11. The QoS (Quality of Service) control method according to claim 6, wherein
    the packet communication device comprises a plurality of input lines, and
    the first mode or the second mode is selected for each of the plurality of input lines.

* * * * *